United States Patent [19]
Shimura

[11] Patent Number: 6,014,149
[45] Date of Patent: Jan. 11, 2000

[54] CHARACTER PATTERN GENERATOR

[75] Inventor: Akihiro Shimura, Tokyo, Japan

[73] Assignee: Canon Kabushiki Kaisha, Tokyo, Japan

[21] Appl. No.: 08/302,465

[22] Filed: Sep. 12, 1994

Related U.S. Application Data

[63] Continuation of application No. 07/829,543, Feb. 4, 1992, abandoned, which is a continuation of application No. 07/489,023, Mar. 5, 1990, abandoned.

[30] Foreign Application Priority Data

Mar. 8, 1989 [JP] Japan ................................. 1-57305

[51] Int. Cl.[7] .................................................. G06F 15/00
[52] U.S. Cl. ............................................................ 345/467
[58] Field of Search ................................... 395/162, 164, 395/165, 166; 345/121, 124, 128, 129, 130, 467, 468, 469, 471, 470

[56] References Cited

U.S. PATENT DOCUMENTS

| 4,298,945 | 11/1981 | Kyte et al. | 364/523 |
|---|---|---|---|
| 4,785,391 | 11/1988 | Apley et al. | 364/518 |
| 4,827,358 | 5/1989 | Matsumoto | 358/296 |
| 4,949,281 | 8/1990 | Hillenbrand et al. | 364/518 |
| 4,959,801 | 9/1990 | Apley et al. | 364/518 |
| 4,962,465 | 10/1990 | Sailo et al. | 364/518 |
| 4,992,954 | 2/1991 | Takeda et al. | 364/518 |
| 5,151,954 | 9/1992 | Takai et al. | 382/41 |

FOREIGN PATENT DOCUMENTS

| 2588212 | 4/1987 | France . |
|---|---|---|
| 027232 | 8/1981 | Japan . |
| 59-180678 | 2/1985 | Japan . |
| 271562 | 5/1985 | Japan . |
| 2161005 | 1/1986 | United Kingdom . |
| 2193162 | 2/1988 | United Kingdom . |
| 2217492 | 10/1989 | United Kingdom . |

OTHER PUBLICATIONS

Computer Design, vol. 19, No. 3, Mar. 1980, pp. 127–133, Concord, US; J.A. Mello et al.: "Multiprocessing improves throughout and response in a vector to raster converter".

Primary Examiner—Phu K. Nguyen
Attorney, Agent, or Firm—Fitzpatrick Cella Harper & Scinto

[57] ABSTRACT

A character pattern generator which is detachably connected to an output device for outputting a pattern as a set of dots, includes a memory for storing a character or figure pattern in a format other than a dot image format, a CPU for converting the character or figure pattern stored in the memory into a dot image in accordance with a pattern request from the output device, and an interface for sending the dot image of the character or figure converted by the CPU to the output device.

29 Claims, 5 Drawing Sheets

FIG. 2
| | | |
|---|---|---|
| 3 | | CLOSED, CONTINUOUS LINE |
| 20 | | NO. OF POINTS |
| 0 | 0 | ( x , y ) |
| 12 | 0 | . |
| 12 | 6 | . |
| 10 | 6 | . |
| 14 | 15 | . |
| 40 | 15 | . |
| 44 | 6 | . |
| 42 | 6 | . |
| 42 | 0 | . |
| 54 | 0 | . |
| 54 | 6 | . |
| 50 | 6 | . |
| 31 | 47 | . |
| 34 | 47 | . |
| 34 | 53 | . |
| 20 | 53 | . |
| 20 | 47 | . |
| 23 | 47 | . |
| 4 | 6 | . |
| 0 | 6 | . |
| 3 | | CLOSED, CONTINUOUS LINE |
| 3 | | NO. OF POINTS |
| 17 | 21 | ( x , y ) |
| 37 | 21 | . |
| 27 | 43 | . |
| 0 | | ( END ) |
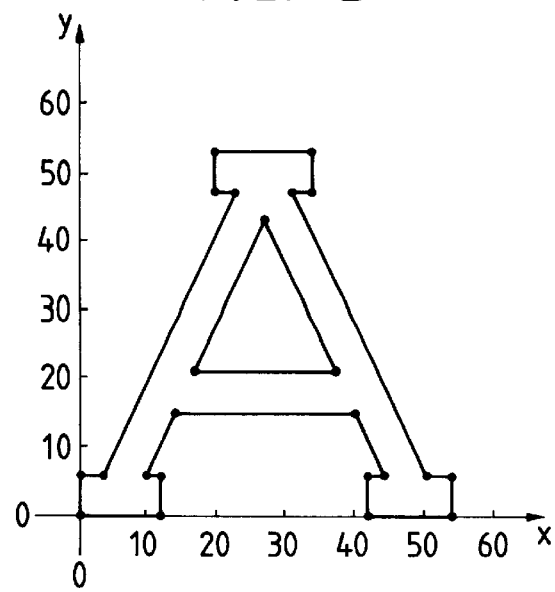
FIG. 3
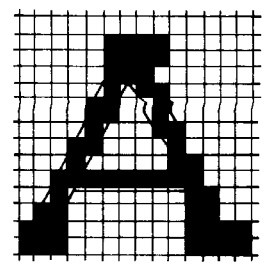
FIG. 4

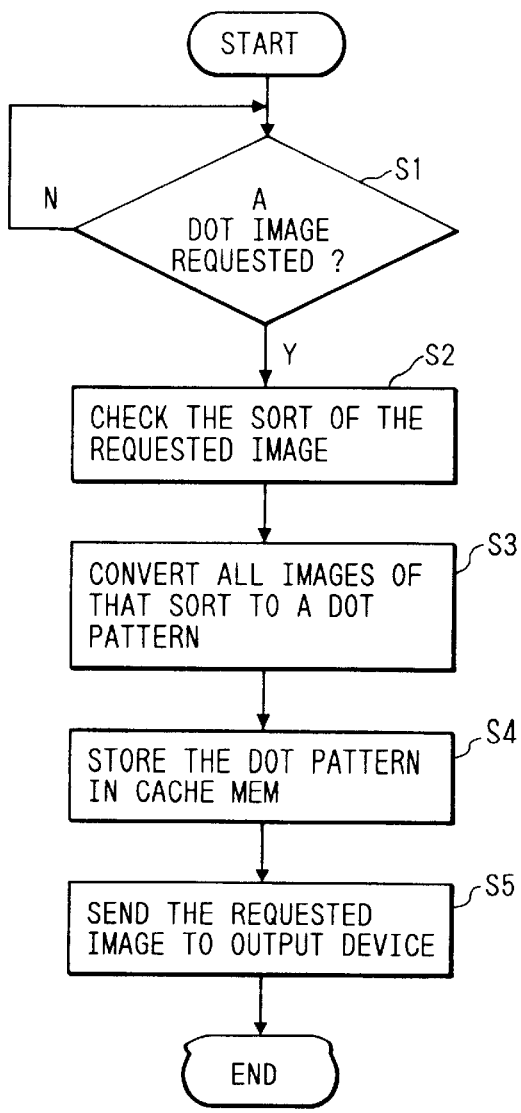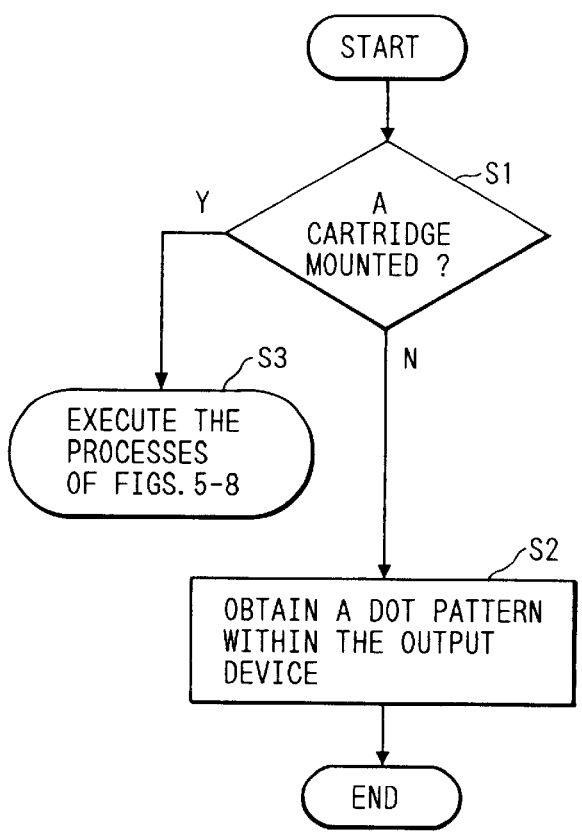

CHARACTER PATTERN GENERATOR

This application is a continuation of application Ser. No. 07/829,543 filed Feb. 4, 1992, now abandoned, which is a continuation of application Ser. No. 07/489,023 filed Mar. 5, 1990, abandoned.

BACKGROUND OF THE INVENTION

1. Field of the Invention

The present invention relates to a character pattern generator which can be attached to an output device, for storing patterns of, e.g., characters, figures, and the like in a format other than a dot image, converting the stored character or figure pattern into a dot image, and outputting the dot image to the output device.

2. Related Background Art

In a detachable character pattern generator for storing patterns of characters, figures, and the like in a format other than a dot image which can be displayed or printed without processing, an output of this generator is its stored content itself, and processing for converting the output into a displayable or printable dot image must be performed by a device (to be referred to as an "output device" hereinafter) to which the detachable character pattern generator is attached.

However, since the conventional processing for converting the output from the generator into a displayable or printable dot image is performed in the output device, the following drawbacks are posed.

(1) A processing load of the output device is increased, and the entire processing speed is decreased.

(2) The generator must store a character pattern in a format corresponding to a processing algorithm for converting the stored pattern into a printable dot image of the output device.

SUMMARY OF THE INVENTION

The present invention has been made in consideration of the above situation, and has as its object to provide a character pattern generator which comprises a storage means for storing patterns of characters, figures, and the like in a format other than a dot image, a conversion means for converting the character or figure pattern stored by the storage means into a dot image, and a sending means for sending the dot image of the character or figure converted by the conversion means to an output device, whereby a processing load of the output device is reduced, and character patterns can be stored regardless of a processing algorithm for converting a pattern into a printable dot image in the output device.

It is another object of the present invention to provide a character pattern generator which stores a pattern in a format other than a dot image, and can convert it into a dot image in parallel with processing in an output device.

It is still another object of the present invention to provide a character pattern generator which stores a pattern in a format other than a dot image, can convert it into a dot image in parallel with processing in an output device, and can store the dot image in a cache memory.

It is still another object of the present invention to provide a character pattern generator which can start and execute development to a dot pattern described above in a cartridge in parallel with processing in an output device when a power switch of the output device is turned on.

It is still another object of the present invention to provide a character pattern generator which, when an output device requests a certain character in a certain character set, can develop a character group of the character set (e.g., fonts, attributes, and the like) into a dot image in parallel with processing in an output device in a cartridge.

BRIEF DESCRIPTION OF THE DRAWINGS

FIG. 2 shows an example of a character which is stored in a format other than a dot image which can be displayed or printed without processing;

FIG. 3 shows a character pattern represented by the data shown in FIG. 2;

FIG. 4 shows a displayable or printable dot image obtained by converting the data shown in FIG. 2;

FIGS. 5 to 9 are operation flow charts of an embodiment of the present invention.

DETAILED DESCRIPTION OF THE PREFERRED EMBODIMENTS

Figure 1:
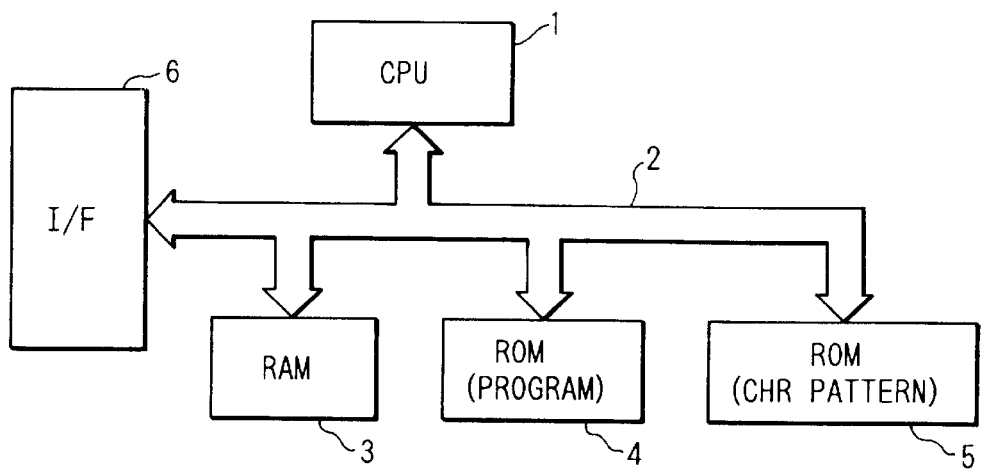
FIG. 1 is a block diagram of a character pattern generator of the present invention.

FIG. 1 is a block diagram of a character pattern generator of the present invention which can be attached to an output device. The generator includes a CPU 1 for controlling the overall generator, a bus 2 including address, data, and control lines of the CPU 1, a RAM 3 used as a work area, and the like of the CPU 1, a program ROM 4 for storing processing programs (to be described later) of the CPU 1, a character pattern ROM 5 for storing patterns of characters, figures, and the like in a format other than a dot image format. For example, the ROM 5 stores a pattern as data representing outlines of a character by a coordinate point string (normally called a vector font, outline font, or the like). An output device interface 6 exchanges commands, dot image data, and the like with an output device to which the generator is attached, and normally comprises a sharing RAM, a 2-port RAM, an FIFO memory, or the like. Although not shown, the generator is powered by the output device (printer), as a matter of course. The program ROM 4 and the character pattern ROM 5 may comprise a single ROM.

FIG. 2 shows an example of a character or figure pattern stored in a format other than a dot image format which can be displayed or printed without processing. In this case, the outlines of a character "A" are expressed by lines.

FIG. 3 shows a pattern of the character "A" represented by the data shown in FIG. 2. A method of storing a character or figure pattern in a format other than a dot image pattern which can be displayed or printed without processing is not limited to that described above. For example, a method of representing outlines of a pattern by lines, various curves or their combinations, a run length font, and the like may be employed as long as a pattern is stored in a format other than a dot image format which can be displayed or printed without processing.

FIG. 4 shows a displayable or printable dot image obtained by converting the character "A" expressed by the data shown in FIG. 2.

Figure 5:
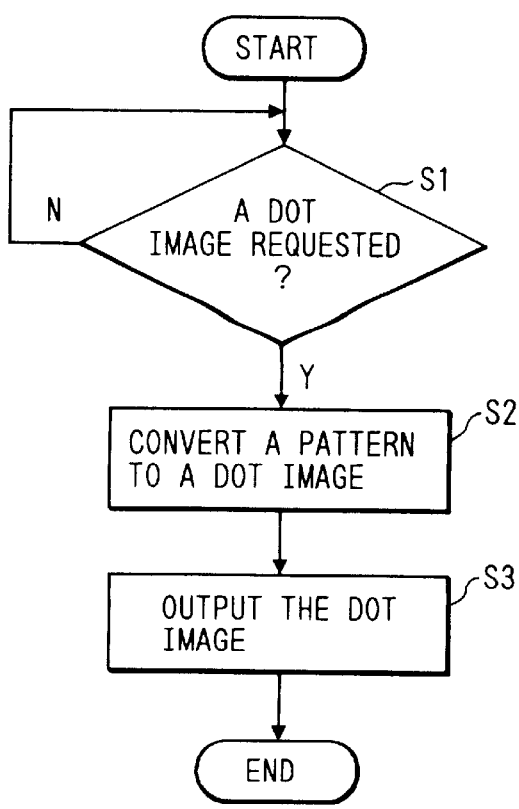
Figure 6:
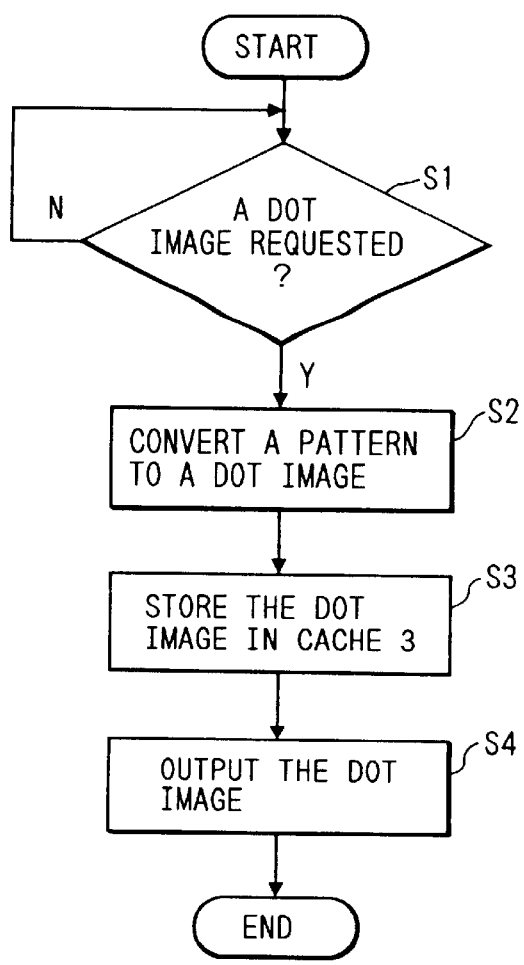

In the above arrangement, an operation of this embodiment will be described below with reference to the flow chart shown in FIG. 5. The program of this flow chart is stored in the ROM 4. When a dot image is requested by, e.g., a command from the output device through the output device interface 6 (S1), the CPU 1 converts a character or figure pattern stored in the character pattern ROM 5 in a format other than a dot image format, which can be displayed or printed without processing, into a displayable or printable dot image (FIG. 4) according to a conversion processing program in the program ROM 4 (S2). The CPU 1 informs completion of conversion to the output device by interruption or the like, and outputs the dot image to the output device through the output device interface 6 (S3). Note that an object to be converted may be, e.g., data of one page to be output or offset character data (according to a frequency, fonts, and the like). Thus, a necessary character need only be transferred to the output device.

According to this embodiment, the output device need not convert a character or figure pattern into a displayable or printable dot image, thus reducing a processing load of the output device. Since the output device does not convert a pattern into a displayable or printable dot image, a character pattern corresponding to a unique conversion method can be stored.

[Another Embodiment]

The present invention is not limited to the above embodiment, and various changes and modifications may be made within the spirit and scope of the invention.

In the embodiment shown in FIG. 1, a temporary storage area (normally called a font cache) for temporarily storing a displayable or printable dot image, and for, when the stored dot image of a character or figure is requested from the output device, outputting the temporarily stored dot image to the output device may be allocated in the RAM 3.

The CPU 1 need not always be a versatile microprocessor but may be a special-purpose processor such as an outline font processor for converting a pattern into a displayable or printable dot image or a combination of a CPU and a special-purpose ALU.

According to this embodiment, the output device need not convert a character or figure pattern into a displayable or printable dot image as in the embodiment described above, and a processing load of the output device can be reduced. Since the output device does not convert a pattern into a displayable or printable dot image, a character pattern corresponding to a unique conversion method can be stored.

As described above, the character pattern generator comprises a means for storing a character or figure pattern in a format other than a dot image format, converting the stored character or figure pattern into a dot image, and outputting the dot image to an output device. Therefore, the output device need not convert a character or figure pattern into a displayable or printable dot image. As a result, a processing load of the output device is reduced, and a processing speed as a whole is increased. In addition, a character pattern corresponding to a unique conversion method can be stored and used. Note that the character pattern generator of the present invention may be a cartridge or a card which is loaded in a slot of the output device and has a program for conversion to fonts, data, and dots.

Conversion to a printable dot image in a cartridge can be executed in parallel with processing in the output device. For example, when the output device comprises a dot printer, the dot printer can parallelly execute processing of data input, data analysis, layout, image drawing, and the like while the character pattern generator of the present invention converts a character or figure pattern into a printable dot image. The printer may comprise an ink-jet printer, a thermal printer, a liquid crystal shutter printer, or the like as long as it is a dot printer. The same applies to a case wherein the output device of the present invention comprises a display device such as a CRT, a liquid crystal display, or the like for displaying a dot pattern.

[Other Embodiments]

Embodiments shown in FIGS. 6 to 9 will be described below. The flow charts of FIGS. 6 to 9 are stored in the program ROM 4 or a ROM in an output device (not shown). In these embodiments, an area in the RAM 3 shown in FIG. 1 is used as a cache memory. In step S1 in FIG. 6, it is checked if a dot image request command is received from the output device (host). If YES in step S1, a pattern which is stored in the character pattern ROM in FIG. 1 in a format other than a dot image format is converted to a dot image in step S2. A host side is informed of completion of conversion by interruption or the like. In step S3, the dot image is stored in a cache memory (3 in FIG. 1). In step S4, the dot image data is sequentially transferred to the output device. In this case, the dot image data is, e.g., data of one page to be output. Note that the data stored in the cache memory is kept stored or deleted according to a frequency, as a matter of course.

Figure 7:
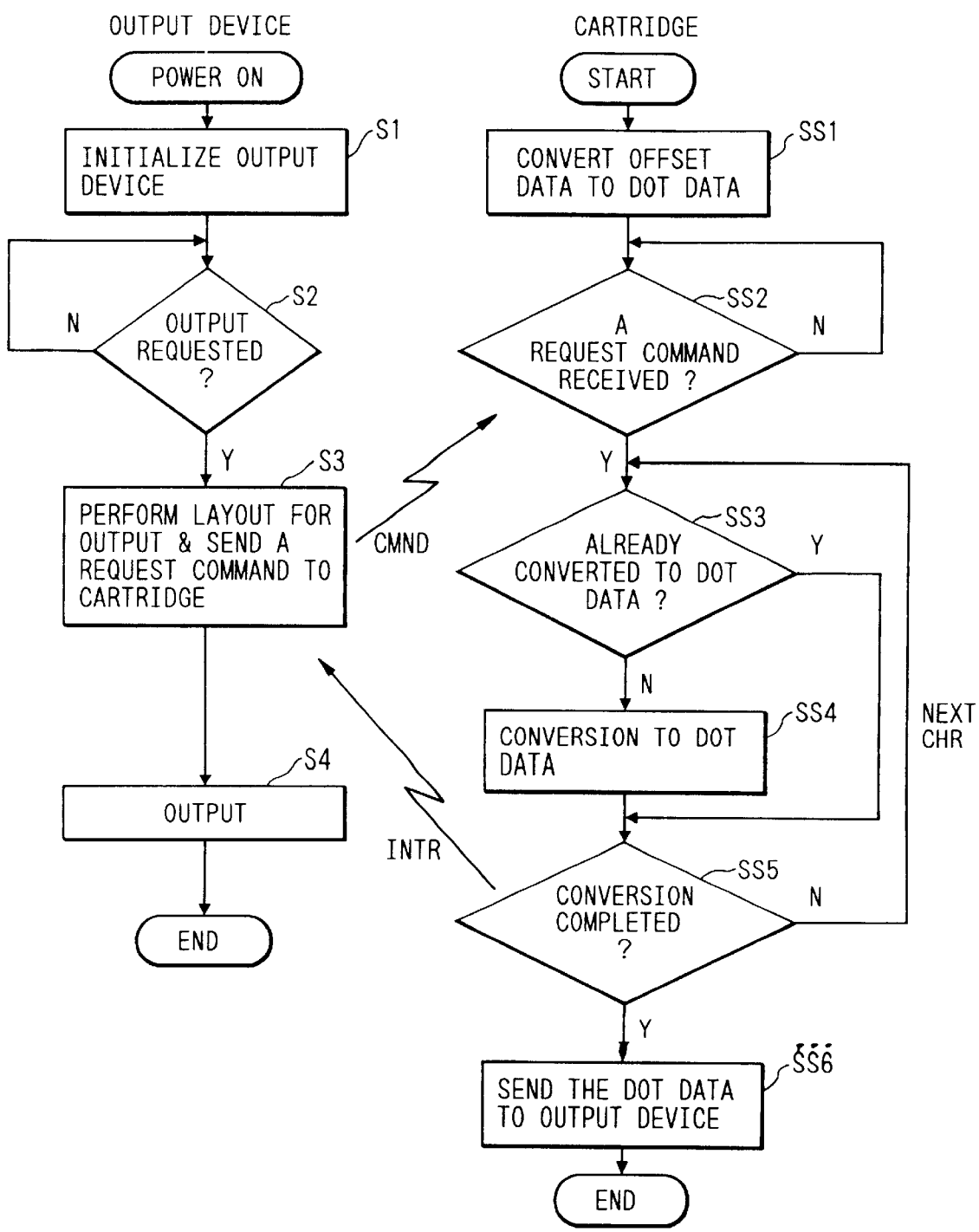

FIG. 7 shows flow charts for explaining processing operations in the output device (host) and a cartridge. When the power switch of the output device is turned on, the output device is initialized in step S1. In step SS1, offset character data is converted to dot data in the cartridge. In the output device, it is checked in step S2 if an output request command from a host 1100 (FIG. 10) is received. If YES in step S2, the flow advances to step S3. In step S3, layout processing (e.g., determination of output positions, and the like) necessary for output is executed, and a character request command is transferred to the cartridge.

In the cartridge, it is checked in step SS2 if the character request command is received from the output device. If YES in step SS2, the flow advances to step SS3. In step SS3, it is checked if a necessary character has already been converted to dot data in step SS1. If YES in step SS3, the flow advances to step SS5; otherwise, the flow advances to step SS4. In step SS4, data corresponding to a necessary character and stored in the ROM 5 (FIG. 1) in a format other than the dot image format is converted to dot image data. It is checked in step SS5 if data of one page necessary for output is converted to dot data. If YES in step SS5, the output device is informed of completion of conversion by interruption. Thereafter, dot data is transferred to the output device through the interface 6 (FIG. 1). The output device performs recording on a recording medium based on the transferred dot data in step S4.

FIG. 8 is a flow chart showing still another processing in the cartridge. In step S1, it is checked if a dot image request command is received from the output device. If YES in step S1, the flow advances to step S2 to check a sort of the requested image (e.g., font, character type, size, and the like).

In step S3, all images of the sort determined in step S2 are converted to a dot pattern (e.g., if a Gothic type is determined, all the Gothic type characters are converted to dot patterns). In step S4, the dot pattern is stored in a cache memory. Thereafter, the requested image is sent to the output device.

FIG. 9 shows processing in the output device. It is checked in step S1 if a cartridge is loaded in a slot. If YES in step S1, execution of the processing operations shown in FIGS. 5 to 8 is enabled. If NO in step S1, a dot pattern meeting the request from the host is obtained based on a font (dot font, nondot font) of the printer in step S2.

Figure 10:
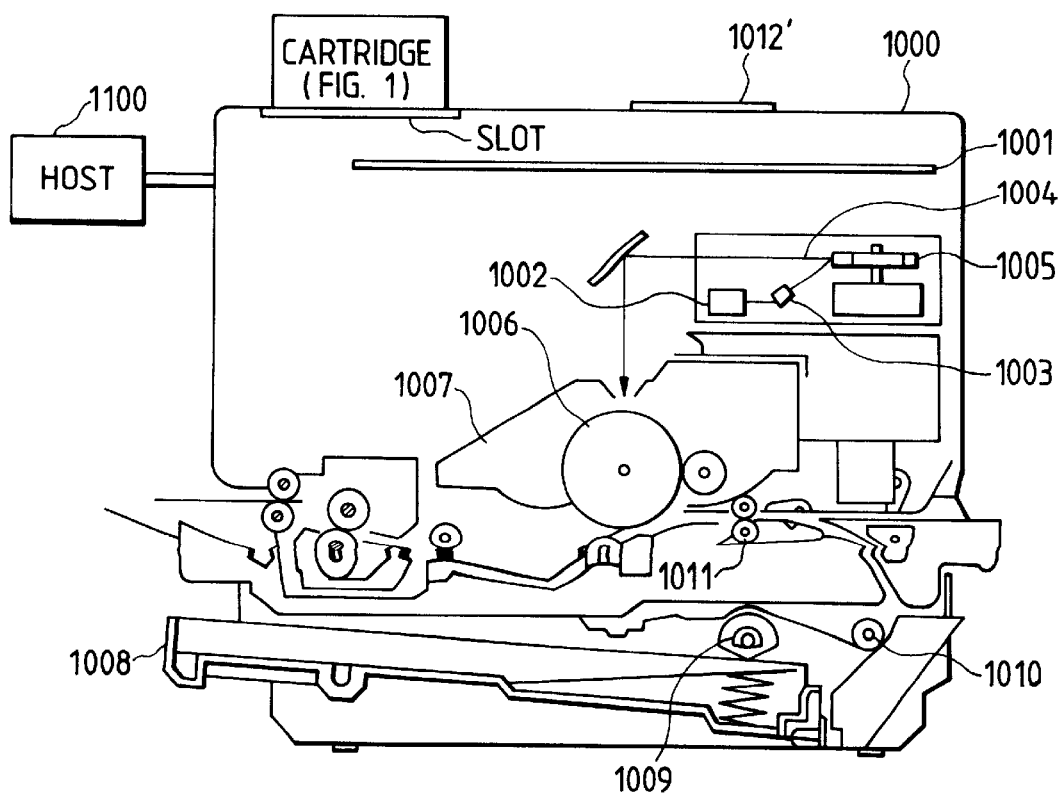
FIG. 10 is a sectional view showing a structure of an output device.

FIG. 10 is a sectional view showing an internal structure of a laser beam printer (to be abbreviated to as an LBP hereinafter) as the output device to which the embodiment of the present invention is applied. The LBP can register character patterns from a data source (not shown) or a standard format (form data).

In FIG. 10, an LBP main body 1000 (FIG. 10) receives and stores character data (character code), form data, or a macro command supplied from an external host computer (1100 in FIG. 10), and generates a corresponding character or form pattern according to these data to form an image on a recording sheet as a recording medium. The LBP 1000 includes an operation panel 1012 on which operation switches, LEDs and the like are arranged, and a printer control unit 1001 for controlling the entire LBP 1000 and analyzing character data and the like supplied from the host computer. The printer control unit 1001 mainly converts character data into a video signal of a corresponding character pattern, and outputs the signal to a laser driver 1002.

The laser driver 1002 is a circuit for driving a semiconductor laser 1003, and ON/OFF-controls a laser beam 1004 emitted from the semiconductor laser 1003 in accordance with the input video signal. The laser beam 1004 is deflected by a rotary polygonal mirror 1005 to scan the surface of an electrostatic drum 1006. Thus, an electrostatic latent image of a character pattern is formed on the electrostatic drum 1006. The latent image is developed by a developing unit 1007 around the electrostatic drum 1006, and is then transferred onto a recording sheet. As the recording sheets, cut sheets are used. The cut recording sheets are stored in a paper cassette 1008, and each sheet is picked up by a paper feed roller 1009 and convey rollers 1010 and 1011 to be fed to the electrostatic drum 1006.

What is claimed is:

1. An output apparatus which outputs a dot pattern, said output apparatus comprising:

connection means for connecting, to said output apparatus, an external apparatus which comprises memory means for storing non-dot data and a program and a central processing unit for generating a dot pattern based on the stored non-dot data and the program; and reading means for, if the external apparatus is connected to said output apparatus by said connection means, reading the generated dot pattern from the external apparatus, and for, if the external apparatus is not connected to said output apparatus, obtaining a dot pattern from pattern information stored within said output apparatus; and output means for outputting the dot pattern read by said reading means, wherein the output apparatus and the external apparatus operate in parallel with each other.

2. An output apparatus according to claim 1, wherein the dot pattern comprises one page of dot images including dot patterns generated based on the non-dot data.

3. An output apparatus according to claim 1, wherein power for the external apparatus is supplied from the output apparatus.

4. An output apparatus according to claim 1, wherein the external apparatus includes a memory for retaining the dot pattern as cache data.

5. An output method for output apparatus which outputs a dot pattern and to which an external apparatus is connectable comprising a memory for storing non-dot data and a program and a central processing unit for generating a dot pattern based on the stored non-dot data and the program, comprising the steps of:

reading, if the external apparatus is connected to the output apparatus, the generated dot pattern from the external apparatus;

obtaining, if the external apparatus is not connected to the output apparatus, a dot pattern from pattern information stored in the output apparatus; and outputting the dot pattern, wherein the external apparatus and the output apparatus execute operations in parallel.

6. An output method according to claim 5, wherein the dot pattern comprises one page of dot images including dot patterns generated based on the non-dot data.

7. An output method according to claim 5, wherein power for the external apparatus is supplied from the output apparatus.

8. An output method according to claim 5, wherein at least one of the operations of the output apparatus is executed in parallel with at least one of the operations of the external apparatus.

9. A data processing apparatus to which a card comprising a memory for storing a program and a central processing unit for generating data based on the program can be connected, said apparatus comprising:

connection means for connecting the card to said data processing apparatus; and reading means for, if the card is connected to said data processing apparatus, reading the generated data from the card, and for, if the card is not connected to said data processing apparatus, reading data stored within said data processing apparatus, wherein operations of the data processing apparatus and the card are executed in parallel.

10. An apparatus according to claim 9, wherein the memory of the card comprises a nonvolatile memory unit for storing the program and a volatile memory unit for storing the generated data.

11. An apparatus according to claim 9, wherein the generated data comprise pattern data.

12. An apparatus according to claim 9, wherein said apparatus comprises a printer.

13. An apparatus according to claim 9, wherein said apparatus comprises a printer.

14. A data processing apparatus according to claim 9, wherein power for the card is supplied from the data processing apparatus.

15. A data processing apparatus according to claim 9, wherein the card includes a memory for retaining the dot pattern as cache data.

16. A data processing method carried out in a data processing apparatus to which a card comprising a memory for storing a program and a central processing unit for generating data based on the program can be connected, said method comprising the steps of:

reading, if the card is connected to the data processing apparatus, the generated data from the card;

reading, if the card is not connected to the data processing apparatus, data stored in the data processing apparatus; and processing the read data, wherein the data processing apparatus and the card execute operations in parallel.

17. A method according to claim 16, wherein the memory of the card comprises a nonvolatile memory unit for storing the program and a volatile memory unit for storing the generated data.

18. A method according to claim 16, wherein the generated data comprise pattern data.

19. A method according to claim 16, wherein the data processing apparatus comprises a printer.

20. A method according to claim 16, wherein the data processing apparatus comprises a display device.

21. A data processing method according to claim 16, wherein power for the card is supplied from the data processing apparatus.

22. A data processing method according to claim 16, wherein at least one of the processing operations of the data processing apparatus is executed in parallel with at least one of the processing operation of the card.

23. A computer usable medium for storing computer readable program code means executed in an output apparatus which outputs a dot pattern and to which an external apparatus is connectable comprising a memory for storing a non-dot data and a program and a central processing unit for generating a dot pattern based on the stored non-dot data and the program, with the computer readable program code means comprising:

first computer readable program code instructions for causing, if the external apparatus is connected to the output apparatus, the generated dot pattern from the external apparatus to be read into the output apparatus, and for causing, if the external apparatus is not connected to the output apparatus, data stored in the output apparatus to be read; and second computer readable program code instructions for causing the read dot pattern to be outputted, wherein operations of the external apparatus and the output apparatus are executed in parallel.

24. A computer usable medium according to claim 23, wherein the dot pattern comprises one page of dot images including dot patterns generated based on the non-dot data.

25. A computer usable medium for storing computer readable program code means executed in a data processing apparatus to which a card comprising a memory for storing a program and a central processing unit for generating data based on the computer readable program can be connected, with the computer readable program code means comprising:

first computer readable program code instructions for causing, if the card is connected to the output apparatus, the generated data from the card to be read into the output apparatus, and for causing, if the card is not connected to the output apparatus, data stored in the output apparatus to be read; and second computer readable program code instructions for causing the read data to be processed, wherein operations of the external apparatus and the output apparatus are executed in parallel.

26. A computer usable medium according to claim 25, wherein the memory of the card comprises a nonvolatile memory unit for storing the program and a volatile memory unit for storing the generated data.

27. A computer usable medium according to claim 25, wherein the generated data comprise pattern data.

28. A computer usable medium according to claim 25, wherein the data processing apparatus comprises a printer.

29. A computer usable medium according to claim 25, wherein the data processing apparatus comprises a display device.

* * * * *

UNITED STATES PATENT AND TRADEMARK OFFICE
CERTIFICATE OF CORRECTION

PATENT NO. : 6,014,149   Page 1 of 1
DATED : January 11, 2000
INVENTOR(S) : Akihiro Shimura It is certified that error appears in the above-identified patent and that said Letters Patent is hereby corrected as shown below:

Title Page:
Item [56] References Cited, under U.S. PATENT DOCUMENTS:
"Sailo et al. "should read --Saiko et al.--; and Under Attorney, Agent, or Firm:
"Fitzpatrick Cella Harper & Scinto" should read
--Fitzpatrick, Cella, Harper & Scinto--.

Column 6:
Line 39, "printer." should read --display device.--.

Signed and Sealed this

Third Day of July, 2001

*Attest:*

*Attesting Officer*

NICHOLAS P. GODICI
*Acting Director of the United States Patent and Trademark Office*